United States Patent
Koenig et al.

(10) Patent No.: US 7,513,018 B2
(45) Date of Patent: Apr. 7, 2009

(54) ANIMATE LOAD BEARER RADIAL ADJUSTER DEVICE FOR CARGO TRANSPORT CARRIERS

(76) Inventors: Thomas L. Koenig, 1350 Hayes St., Suite C-16, Benicia, CA (US) 94510; Margaret Raible, 300 Yachtsman Dr., Vallejo, CA (US) 94591

( * ) Notice: Subject to any disclaimer, the term of this patent is extended or adjusted under 35 U.S.C. 154(b) by 204 days.

(21) Appl. No.: 11/376,514

(22) Filed: Mar. 14, 2006

(65) Prior Publication Data

US 2007/0214611 A1    Sep. 20, 2007

(51) Int. Cl.
*A45F 3/04* (2006.01)
(52) U.S. Cl. .................. 24/68 R; 224/258; 224/259
(58) Field of Classification Search .................. None
See application file for complete search history.

(56) References Cited

U.S. PATENT DOCUMENTS 2,438,188 A * 3/1948 Thrower .................. 242/396.1
4,680,878 A * 7/1987 Pozzobon et al. .......... 36/118.9
6,289,558 B1 * 9/2001 Hammerslag ............. 24/68 SK

* cited by examiner

*Primary Examiner*—Jack W Lavinder
(74) *Attorney, Agent, or Firm*—Audrey A. Millemann; Pamela W. Bertani; Weintraub Genshlea, et al.

(57) ABSTRACT

A radial adjuster device is provided for use in conjunction with cargo transport carriers worn by animate load bearers. The radial adjuster device allows an animate load bearer to adjust each laterally positioned cargo transport carrier shoulder strap or other such support structure single-handedly, or alternatively to adjust each shoulder strap simultaneously using each hand to engage and rotate the radial adjuster device to achieve a desired position or balance of the cargo transport carrier. The radial adjuster device simplifies and optimizes cargo transport carrier adjustment to facilitate animate load bearers in properly positioning cargo transport carriers, and consequently avoiding the injury and discomfort associated with bearing improperly balanced cargo transport carriers. The spooling mechanism of the inventive radial adjuster device eliminates the inconvenience, unsightliness, and potential hazards associated with free-hanging strap ends of cargo transport carriers.

9 Claims, 7 Drawing Sheets

ANIMATE LOAD BEARER RADIAL ADJUSTER DEVICE FOR CARGO TRANSPORT CARRIERS

FIELD OF THE INVENTION

The present invention relates to a device for adjusting the position and balance of cargo transport carriers, such as backpacks, rucksacks, and the like. More specifically, the present invention relates to a device for rotationally adjusting each of two laterally positioned cargo transport carrier shoulder straps in a manner that allows an animate load bearer to adjust each shoulder strap single-handedly, leaving the opposite hand free for others purposes, or to adjust each shoulder strap simultaneously using each hand to engage and rotate the inventive device to achieve a desired position or balance. An animate load bearer employing the inventive device can adjust a cargo transport carrier without the necessity of removing the cargo transport carrier to achieve a desired adjustment, and without the necessity of using both hands to engage a strap and strap adjuster to adjust each shoulder strap, one at a time.

BACKGROUND OF THE INVENTION

For far too long, adjusting the position and balance of cargo transport carriers has been ergonomically and physically awkward, which is a significant and continuing disincentive for properly adjusting, balancing and positioning such carriers. Consequently, animate load bearers have increasingly experienced an elevated incidence of neck, shoulder, and back pain resulting from improperly balanced or positioned cargo transport carriers. The cases and case studies now are legion where often permanent injury and chronic back pain have been epidemiologically linked to poorly positioned and unbalanced cargo transport carriers. The fact of the matter is that many animate load bearers simply opt to bypass transport carrier adjustment and continue bearing unbalanced or ill-positioned loads rather than fiddle with inconveniently located or flimsily constructed conventional shoulder strap adjuster devices.

Alternatively, transport carrier adjustment may actually be desirable, but nonetheless unachievable if, as is often the case, adjustment requires the use of both hands simultaneously or—even worse—complete removal of the cargo transport carrier to achieve a desired adjustment, and an animate load bearer is engaged in an activity that is not conducive to making such an adjustment. For instance, an animate load bearer may be hiking, mountain climbing, skiing, hunting or conducting reconnaissance when cargo within the cargo transport carrier shifts, which makes transport carrier adjustment desirable. However, completely removing the cargo transport carrier for adjustment may not be feasible under such circumstances, and in many cases only one hand is free to engage an adjuster, while the other hand is required to maintain balance or a grip on equipment involving the activity undertaken. Thus, either consciously or unconsciously, animate load bearers often forgo necessary cargo transport carrier adjustments to their own physical peril—or are inconvenienced in the midst of an ongoing activity by having to remove a cargo transport carrier for adjustment, or use both hands to achieve adjustment.

Conventional cargo transport carrier strap adjuster devices do not provide an adequate or effective solution to the disadvantages discussed above. For example, U.S. Pat. No. 4,660,751 to von Dewitz discloses a device to secure and adjust rucksack shoulder straps. Upper ends of each respective shoulder strap are attached to pivotally mounted fittings attached to a retaining piece of the device, which permits lateral distance adjustment between shoulder straps in the shoulder region to adjust to the physical build of the wearer, so that shoulder straps are ideally supported in an optimum position. However, the retaining piece and pivotally mounted shoulder strap fittings are mounted in the center of the rear surface of the rucksack. The shoulder straps are set in position by tightening a tensioning screw attached through the pivotally mounted shoulder strap fittings after the fittings are positioned at a desired pivotal setting. Obviously, the device's configuration and location during use renders access and adjustment inconvenient, and most likely requires that the rucksack be removed, or at a minimum that both hands be used, to achieve the desired adjustment. Moreover, the disclosed device does not provide for incrementally adjusting each shoulder strap individually, or thereby positioning the rucksack so as to achieve a desired balance. Rather, the stated aim of the invention is to secure shoulder straps to the device in a configuration allowing a wearer to adapt the lateral distance between the shoulder straps to the wearer's build and physique.

The invention disclosed in Publication No. US 2004/0205941 A1 is likewise impotent to resolve the aforementioned disadvantages. US 2004/0205941 discloses a reducer adjuster buckle, which is designed for use with flexible webbing tapes, including those attached to harnesses and backpacks. The import of the disclosed invention is to provide a single device that simultaneously engages straps of different widths, to combine the functions of fixedly attaching a wide strap at one end, and slideably adjusting a narrower strap at the opposite end of the device to ultimately achieve adjustment. The slide strap characteristics of the disclosed invention are commensurate with the same disadvantages discussed above, including requiring the use of both hands to adjust each strap at a time, and allowing for the potential of dangling strap ends, which could snag on a nearby object and cause inconvenience or injury—or both.

Physical and functional limitations abound in the above-mentioned, and various other, conventional shoulder strap adjusters. Accordingly, the present invention is designed to eliminate the major adjustment-related limitations inherent in such conventionally available adjusters, and to facilitate an animate load bearer in adjusting a cargo transport carrier easily and effectively. It is plain from the devices discussed above that an animate load bearer must remove the cargo transport carrier in order to make a desired shoulder strap adjustment—or at the very least use both hands simultaneously to engage a strap adjuster and adjust one side shoulder strap at a time. The present invention resolves both of these problems simultaneously by allowing an animate load bearer to incrementally, and therefore more accurately, adjust a shoulder side strap without the necessity of removing the cargo transport carrier to achieve a desired adjustment, and without the companion necessity of using both hands to adjust one side shoulder strap at a time. The inventive radial adjuster device is positioned near the upper abdominal or pectoral areas of an animate load bearer, and is therefore fully visible and easily accessible during use, which obviates the need to remove a cargo transport carrier in order to achieve a desired adjustment. Moreover, the inventive device's structural design, combined with the incorporation of rotational motion to adjust each shoulder strap individually, allows an animate load bearer to manipulate the device and correspondingly adjust each shoulder strap using only one hand, leaving the other hand free for a variety of other purposes, including simultaneously adjusting the laterally positioned radial adjuster device and corresponding side-shoulder strap. In addition, with the inventive device in use, dangling excess shoulder strap ends protruding from each side of a cargo transport carrier are completely eliminated. Thus, an animate load bearer is no longer exposed to the disadvantages and possible dangers associated with snagging excess shoulder strap ends on an inanimate object during an activity, which could prove to be inconvenient at best—and fatal at worse— depending upon the attendant circumstances.

SUMMARY OF THE INVENTION

The inventive device provides for single-handed shoulder strap adjustment of cargo transport carriers by incorporating a vertical lever locking and release portion attached to a rotating portion designed with circumferentially disposed finger slots, which in combination allow an animate load bearer to release the device from its locked position; radially turn the rotating portion and tighten or loosen the corresponding strap until a desired position or balance is achieved; and thereafter release the lever portion to lock the device in its new position. In use, the device is positioned near the upper abdominal or pectoral regions of an animate load bearer, which facilitates convenient access and manipulation of the device without the necessity of removing, or awkwardly engaging, an attached cargo transport carrier to achieve a desired adjustment. The device employs an internal spooling portion, around which strap excess is wound when a strap is tightened, and from which strap excess is released when a strap is loosened, which not only facilitates accurate and incremental cargo transport carrier adjustment, but also completely eliminates the external protrusion of excess strap length from each side of a cargo transport carrier.

OBJECTS OF THE INVENTION

A primary object of the present invention is to provide a new and novel device for adjusting the position and balance of cargo transport carriers in a manner that allows an animate load bearer to adjust each laterally positioned cargo transport carrier strap single-handedly, or simultaneously, without the necessity of removing the cargo transport carrier to effectuate the desired position and balance, and which eliminates the inconvenience, unsightliness, and potential hazard associated with protruding excess strap ends free-hanging from cargo transport carriers during use.

Viewed from a first vantage point, it is an object of the present invention to provide a device coupled to and adjusting a cargo transport carrier, said device comprising, in combination: a base portion; a strap; a means for attaching said strap to said cargo transport carrier; and a rotating portion operatively attached to said base portion and spooling said strap, and having; a means for locking said rotation portion in place and conversely releasing said rotating portion and allowing for turning of said rotation portion to adjust said strap and therefore its length relative to said cargo transport carrier.

Viewed from a second vantage point, it is an object of the present invention to provide a device coupled to and adjusting a cargo transport carrier, said device comprising, in combination: a base portion; a strap; a means for attaching said strap to said cargo transport carrier; and a rotating portion operatively attached to said base portion and spooling said strap, and having; a means for locking said rotation portion in place and conversely releasing said rotating portion and allowing for turning of said rotation portion to adjust said strap and therefore its length relative to said cargo transport carrier, wherein said base portion further comprises a centrally positioned spool receiver and said rotating portion comprises a centrally positioned strap spool, for accommodating strap adjustment and securing said base portion and said rotating portion in operative contact.

Viewed from a third vantage point, it is an object of the present invention to provide a device coupled to and adjusting a cargo transport carrier, said device comprising, in combination: a base portion; a strap; a means for attaching said strap to said cargo transport carrier; and a rotating portion operatively attached to said base portion and spooling said strap, and having; a means for locking said rotation portion in place and conversely releasing said rotating portion and allowing for turning of said rotation portion to adjust said strap and therefore its length relative to said cargo transport carrier, wherein said base portion further comprises a centrally positioned spool receiver and said rotating portion comprises a centrally positioned strap spool, for accommodating strap adjustment and securing said base portion and said rotating portion in operative contact, and wherein said spool receiver of said base portion is hollow-centered and said strap spool of said rotating portion is hollow-centered and contains a threading slot through which said strap is received, and to which said strap is fixed to facilitate spooling when said rotating portion is turned.

Viewed from a fourth vantage point, it is an object of the present invention to provide a device coupled to and adjusting a cargo transport carrier, said device comprising, in combination: a base portion; a strap; a means for attaching said strap to said cargo transport carrier; and a rotating portion operatively attached to said base portion and spooling said strap, and having; a means for locking said rotation portion in place and conversely releasing said rotating portion and allowing for turning of said rotation portion to adjust said strap and therefore its length relative to said cargo transport carrier, wherein said base portion further comprises a centrally positioned spool receiver and said rotating portion comprises a centrally positioned strap spool, for accommodating strap adjustment and securing said base portion and said rotating portion in operative contact, and wherein said spool receiver of said base portion is hollow-centered and said strap spool of said rotating portion is hollow-centered and contains a threading slot through which said strap is received, and to which said strap is fixed to facilitate spooling when said rotating portion is turned, and wherein said base portion further comprises an attached circumferentially disposed wall having a plurality of radially disposed holes to assist in locking said device in place.

Viewed from a fifth vantage point, it is an object of the present invention to provide a device coupled to and adjusting a cargo transport carrier, said device comprising, in combination: a base portion; a strap; a means for attaching said strap to said cargo transport carrier; and a rotating portion operatively attached to said base portion and spooling said strap, and having; a means for locking said rotation portion in place and conversely releasing said rotating portion and allowing for turning of said rotation portion to adjust said strap and therefore its length relative to said cargo transport carrier, wherein said base portion further comprises a centrally positioned spool receiver and said rotating portion comprises a centrally positioned strap spool, for accommodating strap adjustment and securing said base portion and said rotating portion in operative contact, and wherein said spool receiver of said base portion is hollow-centered and said strap spool of said rotating portion is hollow-centered and contains a threading slot through which said strap is received, and to which said strap is fixed to facilitate spooling when said rotating portion is turned, and wherein said base portion further comprises an attached circumferentially disposed wall having a plurality of radially disposed holes to assist in locking said device in place, and wherein said rotating portion further comprises a plurality of circumferentially disposed concave indentations to facilitate adjustment of said device.

Viewed from a sixth vantage point, it is an object of the present invention to provide a device coupled to and adjusting a cargo transport carrier, said device comprising, in combination: a base portion; a strap; a means for attaching said strap to said cargo transport carrier; and a rotating portion operatively attached to said base portion and spooling said strap, and having; a means for locking said rotation portion in place and conversely releasing said rotating portion and allowing for turning of said rotation portion to adjust said strap and therefore its length relative to said cargo transport carrier, wherein said base portion further comprises a centrally positioned spool receiver and said rotating portion comprises a centrally positioned strap spool, for accommodating strap adjustment and securing said base portion and said rotating portion in operative contact, and wherein said spool receiver of said base portion is hollow-centered and said strap spool of said rotating portion is hollow-centered and contains a threading slot through which said strap is received, and to which said strap is fixed to facilitate spooling when said rotating portion is turned, and wherein said base portion further comprises an attached circumferentially disposed wall having a plurality of radially disposed holes to assist in locking said device in place, and wherein said rotating portion further comprises a plurality of circumferentially disposed concave indentations to facilitate adjustment of said device, and wherein said means for locking said rotating portion in place or conversely releasing said rotating portion comprises a centrally attached adjustable lever atop said rotating portion.

Viewed from a seventh vantage point, it is an object of the present invention to provide a device coupled to and adjusting a cargo transport carrier, said device comprising, in combination: a base portion; a strap; a means for attaching said strap to said cargo transport carrier; and a rotating portion operatively attached to said base portion and spooling said strap, and having; a means for locking said rotation portion in place and conversely releasing said rotating portion and allowing for turning of said rotation portion to adjust said strap and therefore its length relative to said cargo transport carrier, wherein said base portion further comprises a centrally positioned spool receiver and said rotating portion comprises a centrally positioned strap spool, for accommodating strap adjustment and securing said base portion and said rotating portion in operative contact, and wherein said spool receiver of said base portion is hollow-centered and said strap spool of said rotating portion is hollow-centered and contains a threading slot through which said strap is received, and to which said strap is fixed to facilitate spooling when said rotating portion is turned, and wherein said base portion further comprises an attached circumferentially disposed wall having a plurality of radially disposed holes to assist in locking said device in place, and wherein said rotating portion further comprises a plurality of circumferentially disposed concave indentations to facilitate adjustment of said device, and wherein said means for locking said rotating portion in place or conversely releasing said rotating portion comprises a centrally attached adjustable lever atop said rotating portion, and wherein said adjustable lever is in operative contact with an attached insertion means, and deposits said insertion means into one of said plurality of radially disposed holes on said base portion when said adjustable lever is released, and removes said insertion means from one of said plurality of radially disposed holes on said base portion when said adjustable lever is depressed, which permits adjustment of said rotating portion when an animate load bearer engages said plurality of circumferentially disposed concave indentations to adjust said device.

Viewed from an eighth vantage point, it is an object of the present invention to provide a device coupled to and adjusting a cargo transport carrier, said device comprising, in combination: a base portion; a strap; a means for attaching said strap to said cargo transport carrier; and a rotating portion operatively attached to said base portion and spooling said strap, and having; a means for locking said rotation portion in place and conversely releasing said rotating portion and allowing for turning of said rotation portion to adjust said strap and therefore its length relative to said cargo transport carrier, wherein said base portion further comprises a centrally positioned spool receiver and said rotating portion comprises a centrally positioned strap spool, for accommodating strap adjustment and securing said base portion and said rotating portion in operative contact, and wherein said spool receiver of said base portion is hollow-centered and said strap spool of said rotating portion is hollow-centered and contains a threading slot through which said strap is received, and to which said strap is fixed to facilitate spooling when said rotating portion is turned, and wherein said base portion further comprises an attached circumferentially disposed wall having a plurality of radially disposed holes to assist in locking said device in place, and wherein said rotating portion further comprises a plurality of circumferentially disposed concave indentations to facilitate adjustment of said device, and wherein said means for locking said rotating portion in place or conversely releasing said rotating portion comprises a centrally attached adjustable lever atop said rotating portion, and wherein said adjustable lever is in operative contact with an attached insertion means, and deposits said insertion means into one of said plurality of radially disposed holes on said base portion when said adjustable lever is released, and removes said insertion means from one of said plurality of radially disposed holes on said base portion when said adjustable lever is depressed, which permits adjustment of said rotating portion when an animate load bearer engages said plurality of circumferentially disposed concave indentations to adjust said device, and wherein said adjustable lever is attached to said rotating portion by an adjustable attachment means, which passes through an aperture atop said adjustable lever, and further through said strap spool of said rotating portion, and further through said spool receiver of said base portion to fixedly attach said base portion and said rotating portion in operative communication.

Viewed from a ninth vantage point, it is an object of the present invention to provide a device coupled to and adjusting a cargo transport carrier, said device comprising, in combination: a strap; a base portion having; a strap receiving opening to attach said strap to said base portion; an oppositely disposed strap receiving opening to attach said device to said cargo transport carrier; a centrally attached spool receiver for securing said device in place, and an attached circumferentially disposed wall having a plurality of radially disposed holes to assist in locking said device in place; and a rotating portion having; a centrally attached adjustable lever for either locking said rotating portion in place, or releasing said rotating portion and allowing for turning of said rotating portion to adjust said cargo transport carrier, a strap spool for receiving said strap from said strap receiving opening of said base portion, and either engaging or disengaging said strap when said adjustable lever is depressed or released, and said rotating portion is turned either clockwise or counterclockwise to adjust said cargo transport carrier, and an insertion means in operative contact with said adjustable lever, which is removed from or inserted into one of said plurality of radially disposed holes of said base portion when said adjustable lever is respectively depressed or released.

From a tenth vantage point, it is an object of the present invention to provide a device coupled to and adjusting a cargo transport carrier, said device comprising, in combination: a strap; a base portion having; a strap receiving opening to attach said strap to said base portion; an oppositely disposed strap receiving opening to attach said device to said cargo transport carrier; a centrally attached spool receiver for securing said device in place, and an attached circumferentially disposed wall having a plurality of radially disposed holes to assist in locking said device in place; and a rotating portion having; a centrally attached adjustable lever for either locking said rotating portion in place, or releasing said rotating portion and allowing for turning of said rotating portion to adjust said cargo transport carrier, a strap spool for receiving said strap from said strap receiving opening of said base portion, and either engaging or disengaging said strap when said adjustable lever is depressed or released, and said rotating portion is turned either clockwise or counterclockwise to adjust said cargo transport carrier, and an insertion means in operative contact with said adjustable lever, which is removed from or inserted into one of said plurality of radially disposed holes of said base portion when said adjustable lever is respectively depressed or released, and wherein said insertion means is housed in a rounded cavity positioned on a rotating inner perimeter section of said rotating portion.

Viewed from an eleventh vantage point, it is an object of the present invention to provide a device couple to and adjusting a cargo transport carrier, said device comprising, in combination: a strap; a base portion having; a strap receiving opening to attach said strap to said base portion; an oppositely disposed strap receiving opening to attach said device to said cargo transport carrier; and an attached circumferentially disposed wall having a plurality of radially disposed holes to assist in locking said device in place; and a rotating portion having; a centrally attached adjustable lever for either locking said rotating portion in place, or releasing said rotating portion and allowing for turning of said rotating portion to adjust said cargo transport carrier, a strap spool for receiving said strap from said strap receiving opening of said base portion, and either engaging or disengaging said strap when said adjustable lever is depressed or released, and said rotating portion is turned either clockwise or counterclockwise to adjust said cargo transport carrier, a plurality of circumferentially disposed concave indentations for engaging and turning said rotating portion, and an insertion means in operative contact with said adjustable lever, which is removed from or inserted into one of said plurality of radially disposed holes of said base portion when said adjustable lever is respectively depressed or released.

Viewed from a twelfth vantage point, it is an object of the present invention to provide a method for eliminating loose ends of tethers which support article transport carriers, comprising the steps of training a portion of said tethers into a storage area thereby altering the effective length of said tethers; and eliminating loose ends of said tethers where said tethers attach to said cargo transport carrier.

Viewed from a thirteenth vantage point, it is an object of the present invention to provide a method for eliminating loose ends of tethers which support article transport carriers, comprising the steps of: training a portion of said tethers into a storage area thereby altering the effective length of said tethers; and eliminating loose ends of said tethers where said tethers attach to said cargo transport carrier, and further including spooling each of said tethers on a reel within said storage area.

Viewed from a fourteenth vantage point, it is an object of the present invention to provide a method for eliminating loose ends of tethers which support article transport carriers, comprising the steps of: training a portion of said tethers into a storage area thereby altering the effective length of said tethers; and eliminating loose ends of said tethers where said tethers attach to said cargo transport carrier, and further including spooling each of said tethers on a reel within said storage area, and further including threading each of said tethers though a terminally disposed tether receiving opening, and subsequently through a slot within said storage area, to secure each of said tethers within said storage area and facilitate spooling each of said tethers.

Viewed from a fifteenth vantage point, it is an object of the present invention to provide a method for eliminating loose ends of tethers which support article transport carriers, comprising the steps of: training a portion of said tethers into a storage area thereby altering the effective length of said tethers; and eliminating loose ends of said tethers where said tethers attach to said cargo transport carrier, and further including spooling each of said tethers on a reel within said storage area, and further including threading each of said tethers though a terminally disposed tether receiving opening, and subsequently through a slot within said storage area, to secure each of said tethers within said storage area and facilitate spooling each of said tethers, and further including adjusting the length of each of said tethers by spooling or alternatively unspooling each of said tethers by turning a rotating portion operatively attached to a base portion, which together define said storage area.

DESCRIPTION OF PREFERRED EMBODIMENTS

Figure 1:
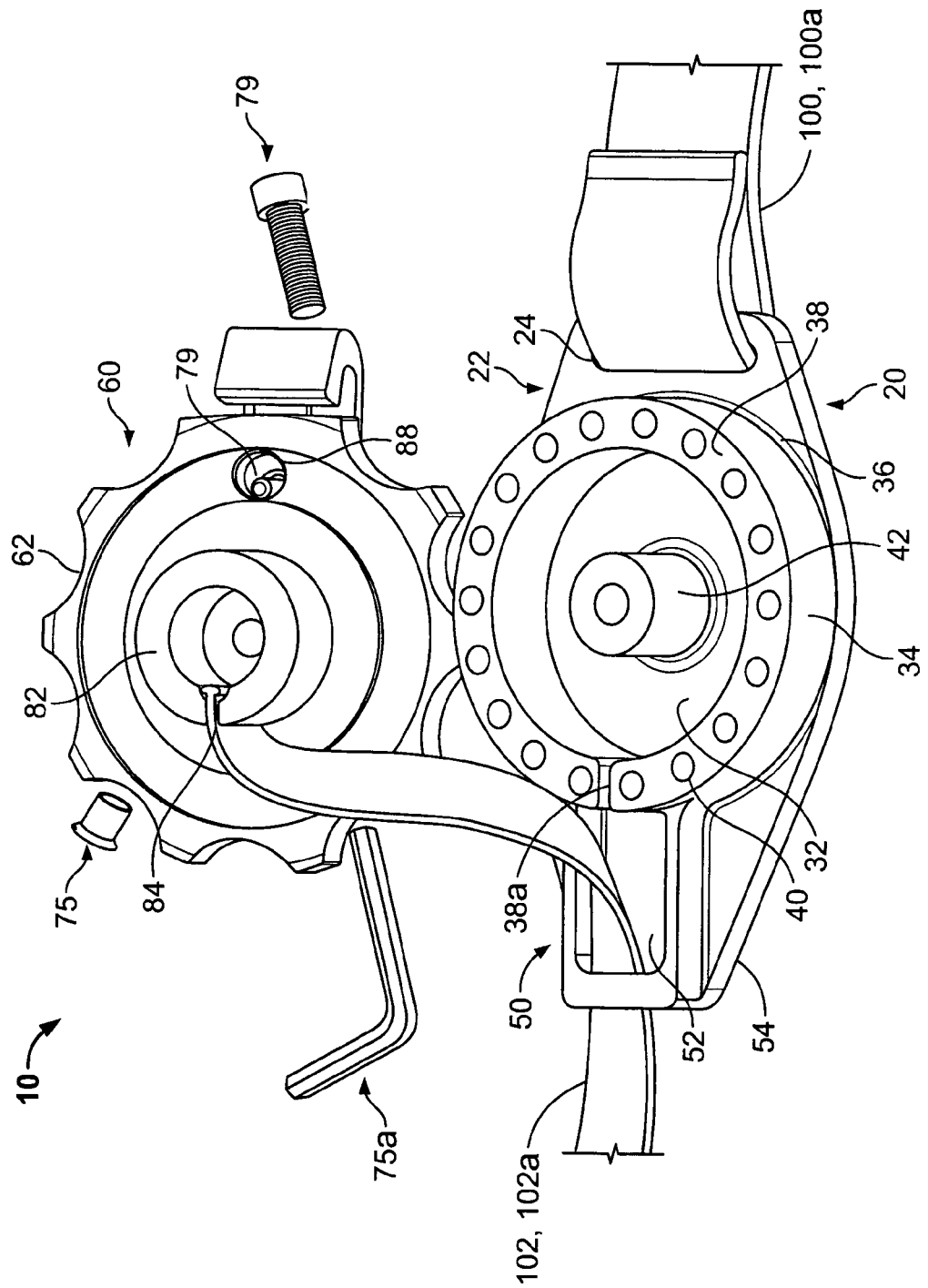
FIG. 1 depicts a top perspective view of component parts of the radial adjuster device of the present invention, positioned open-faced and side by side.
Figure 1A:
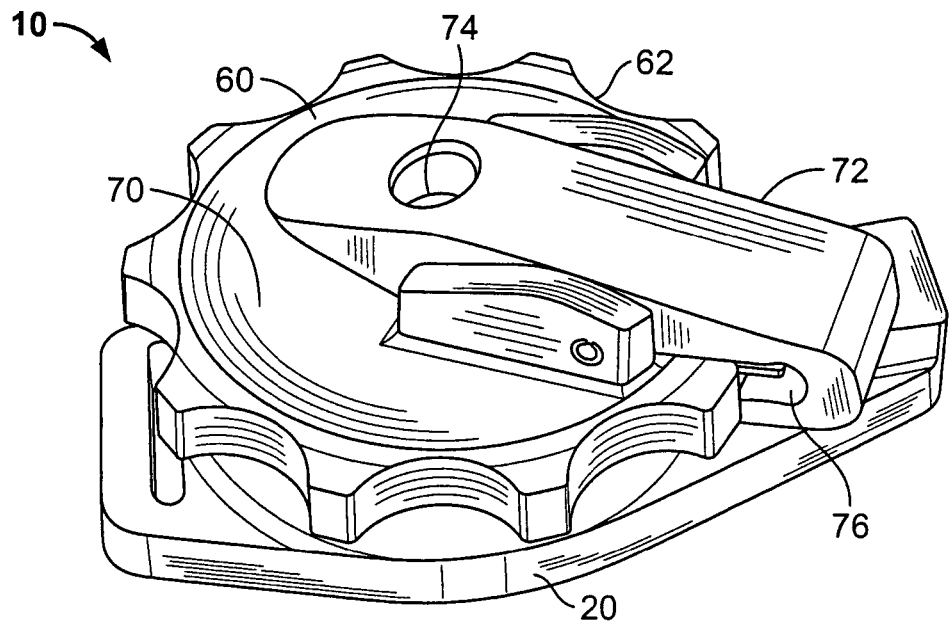
FIG. 1A depicts a front perspective view of the radial adjuster device of the present invention.
Figure 1B:
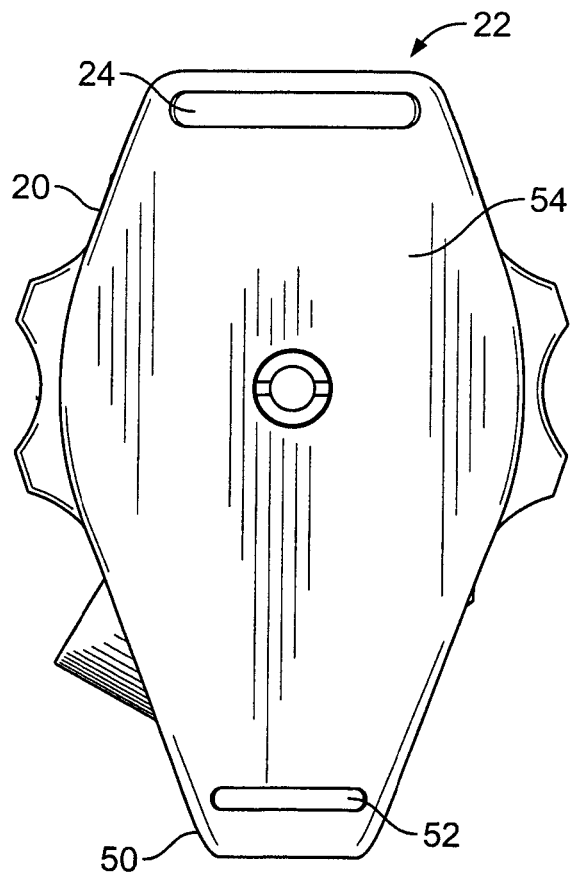
FIG. 1B depicts a bottom side view of the radial adjuster device of the present invention.
Figure 1C:
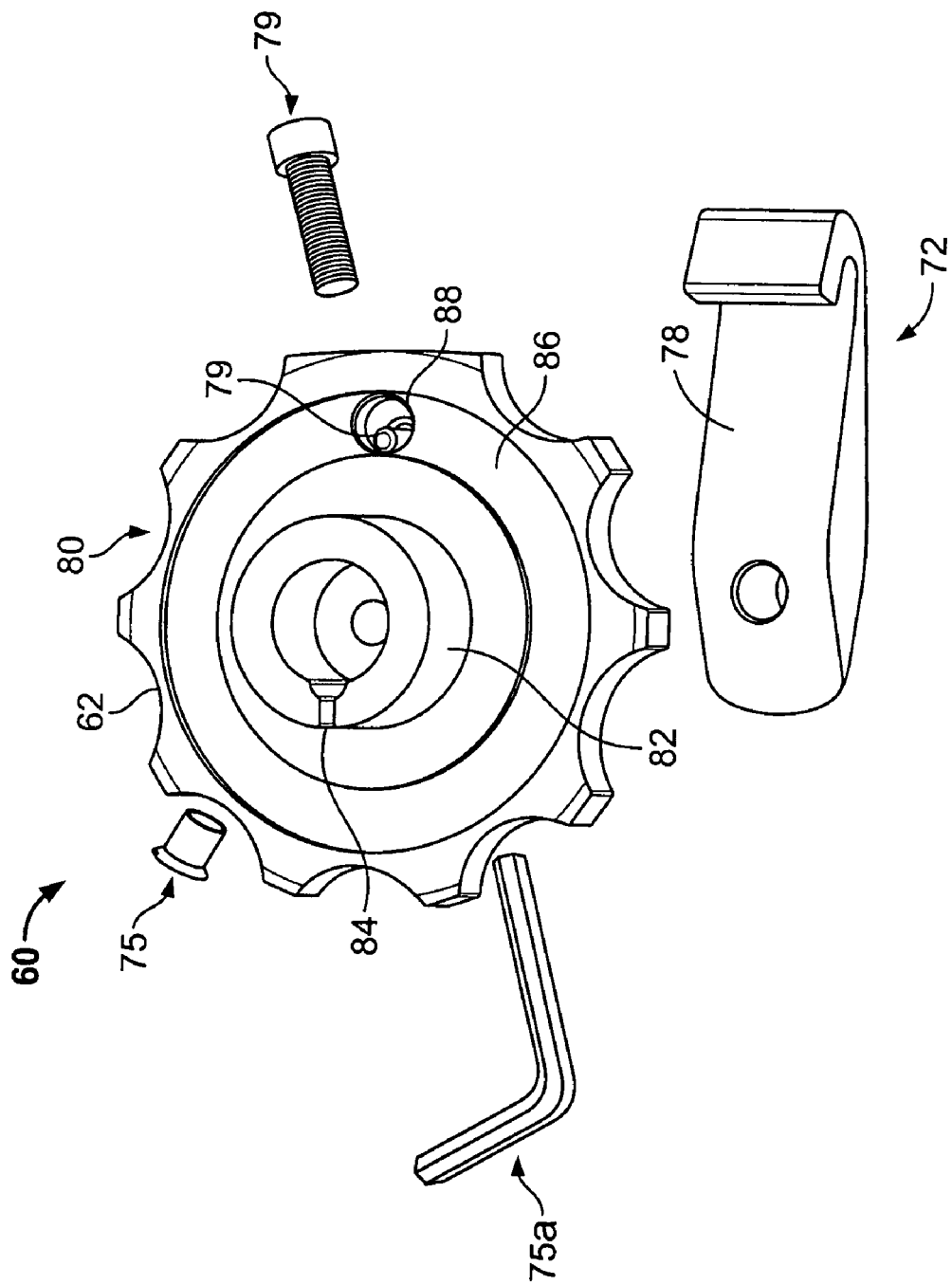
FIG. 1C depicts a bottom side perspective view of the rotating portion of the radial adjuster device of the present invention, with an exploded view of the insertion means, the adjustable lever, the adjustable attachment means, and the attachment means adjuster.
Figure 1D:
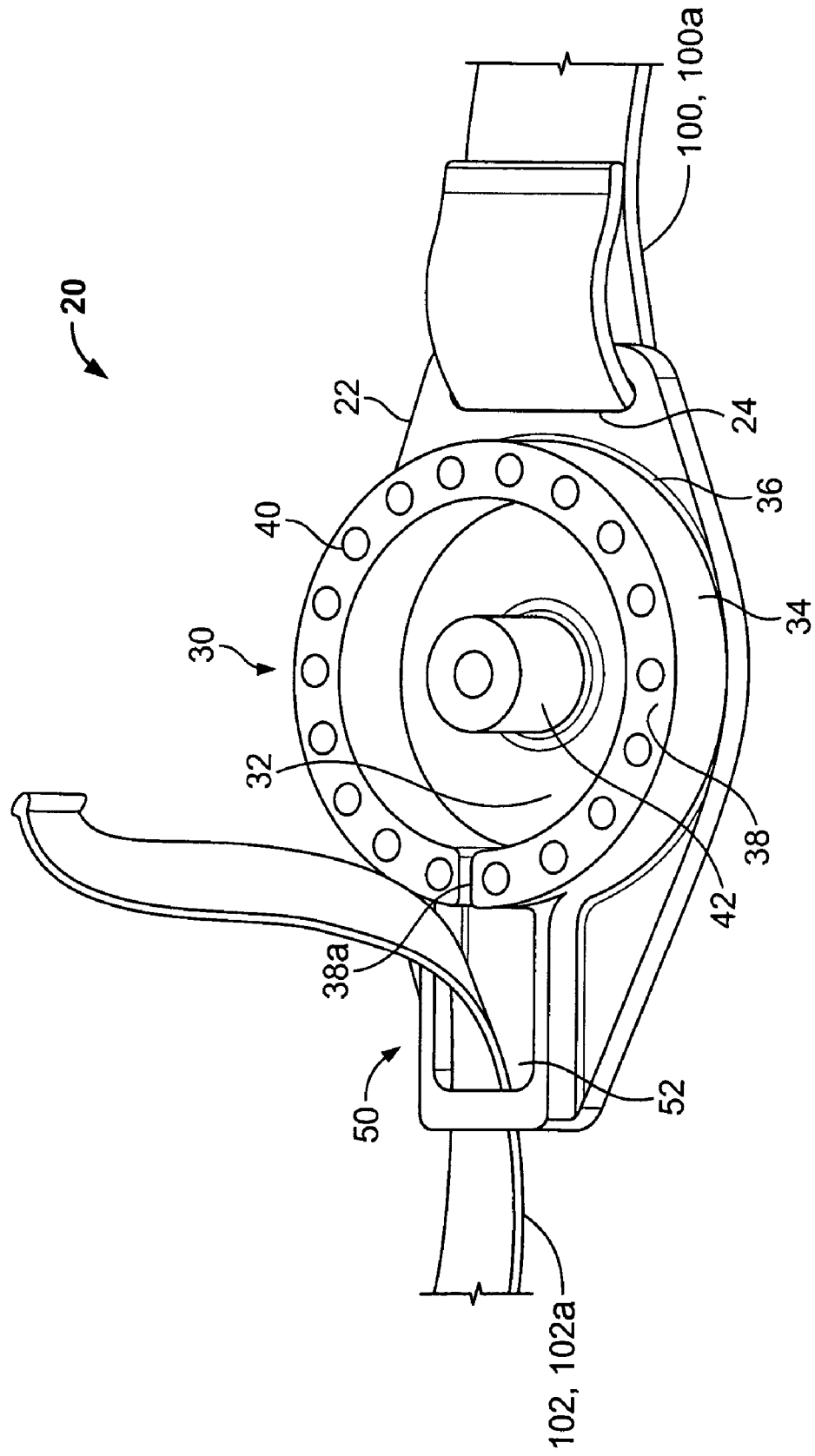
FIG. 1D depicts a top side perspective view of the base portion of the radial adjuster device of the present invention, with cargo transport carrier straps shown in phantom.

Referring to the drawings, wherein like numerals denote like parts throughout the various drawing figures, reference numeral 10 as shown in FIG. 1 is directed to the animate load bearer radial adjuster device of the present invention.

The radial adjuster device according to the present invention includes application to various cargo transport carriers, including rucksacks, specialized backpacks, and standard backpacks. The radial adjuster device of the present invention replaces conventional vertical slide strap adjusters, ladder lock strap adjusters, and the like, which typically require an animate load bearer to use both hands when adjusting the cargo transport carrier, or even more cumbersome, to remove the cargo transport carrier entirely in order to achieve balanced adjustment. The inventive radial adjuster device provides for balanced strap adjustment via lateral rotational motion, which can be accomplished using one hand to manipulate the device to adjust one side strap at a time, leaving the animate load bearer with an opposite free hand to use for any number of advantageous purposes, including maintaining a grip on inanimate objects, or maintaining stability in the midst of an ongoing activity, such as climbing, hiking or a variety of other activities.

The radial adjuster device (10) of the present invention comprises a base portion (20) and a rotating portion (60), operatively attached to an adjustable strap, tether, or like supporting structure (102, 102a), and to a stationary strap, tether, or like supporting structure (100, 100a). Radial adjuster device (10) may be constructed of an array of appropriate materials ranging from lightweight plastics to denser metal materials. Adjustable straps (102, 102a) and stationary straps (100, 100a) may be constructed of a variety of durable materials, including Nylon, Nylon-blends, and the like.

Base portion (20) comprises a top end (22) with a first strap receiving opening (24) to receive stationary straps (100, 100a) and attach radial adjuster device (10) to a cargo transport carrier in place of a conventional slide strap adjuster and similar conventional devices. Base portion (20) also comprises a central section (30), which includes a circular bottom (32) and attached circumferentially disposed wall (34) having a bottom portion (36) and a top portion (38). Top portion (38) of circumferentially disposed wall (34) contains a plurality of radially disposed holes (40), which operate to lock radial adjuster device (10) in place as described in detail below.

Central section (30) of base portion (20) further comprises a hollow-centered spool receiver (42) attached centrally on, and extending upwardly from, circular bottom (32) of central section (30), onto which rotating portion (60) is securely positioned as described in detail below. Bottom end (50) of base portion (20) has a second strap receiving opening (52), to receive adjustable straps (102, 102a) and attach radial adjuster device (10) to a cargo transport carrier, as more specifically described below. Bottom side (54) of base portion (20) is substantially stationary in operation and is positioned flush against the pectoral or upper abdominal area of an animate load bearer during use.

Rotating portion (60) of radial adjuster device (10) is rounded in shape and comprises a plurality of circumferentially disposed concave indentations (62) spatially positioned around the perimeter of rotating portion (60) and designed to function as finger slots for radially turning rotating portion (60) to adjust laterally positioned transport carrier shoulder straps. Top side (70) of rotating portion (60) comprises a centrally attached adjustable lever (72) extending longitudinally from central attachment point (74), through which an adjustable attachment means (75) is fixedly inserted to operatively attach base portion (20) and rotating portion (60). Adjustable lever (72) is designed with a concave end portion (76), which fits around and under the perimeter of rotation portion (60) to further facilitate locking rotation portion (60) in place once a desired shoulder strap and corresponding cargo transport carrier position is achieved. An animate load bearer can depress adjustable lever (72) to release rotating portion (60) from a locked position and simultaneously engage concave indentations (62) to radially turn rotating portion (60) and correspondingly adjust laterally positioned shoulder straps and the attached cargo transport carrier.

Bottom side (80) of rotating portion (60) is designed with an attached rounded hollow-centered strap spool (82) extending outward from the center of bottom side (80). Strap spool (82) has a threading slot (84) operatively positioned within its perimeter to receive the end of an adjustable strap (102, 102a) extending from second strap receiving opening (52) of top end (50) of base portion (20). A rotating inner perimeter section (86) of bottom side (80) of rotating portion (60) turns when an animate load bearer depresses adjustable lever (72) and simultaneously inserts his or her fingers in concave indentations (62) and turns rotating portion (60) to adjust either one or both adjustable straps (102, 102a) and correspondingly the cargo transport carrier. Rotating inner perimeter section (86) includes a rounded cavity (88), which houses insertion means (79), which is in operative contact with adjustable lever (72), and facilitates locking and unlocking radial adjuster device (10) as described more fully below.

Figure 2:
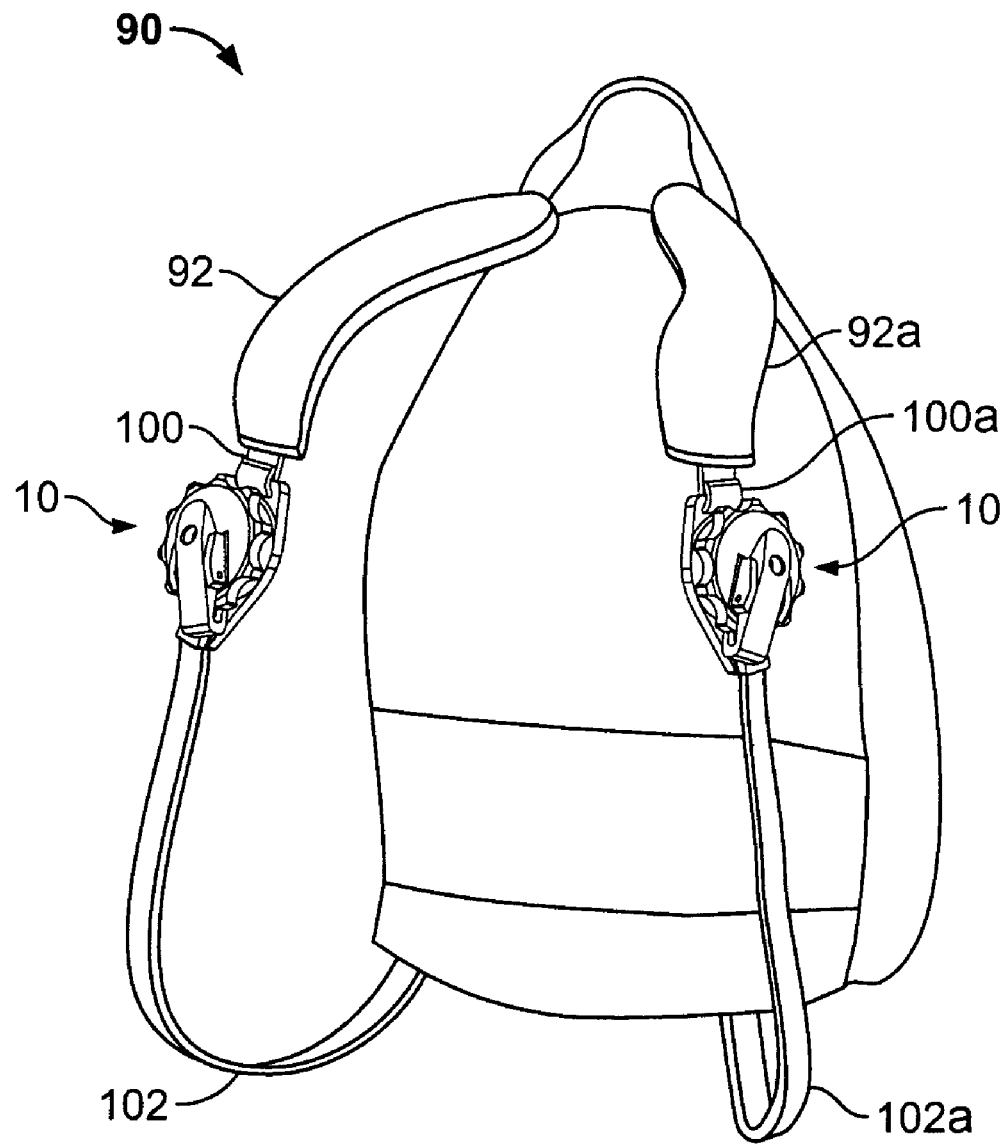
FIG. 2 depicts a front perspective view of the radial adjuster device of the present invention as used on a cargo transport carrier.
Figure 3:
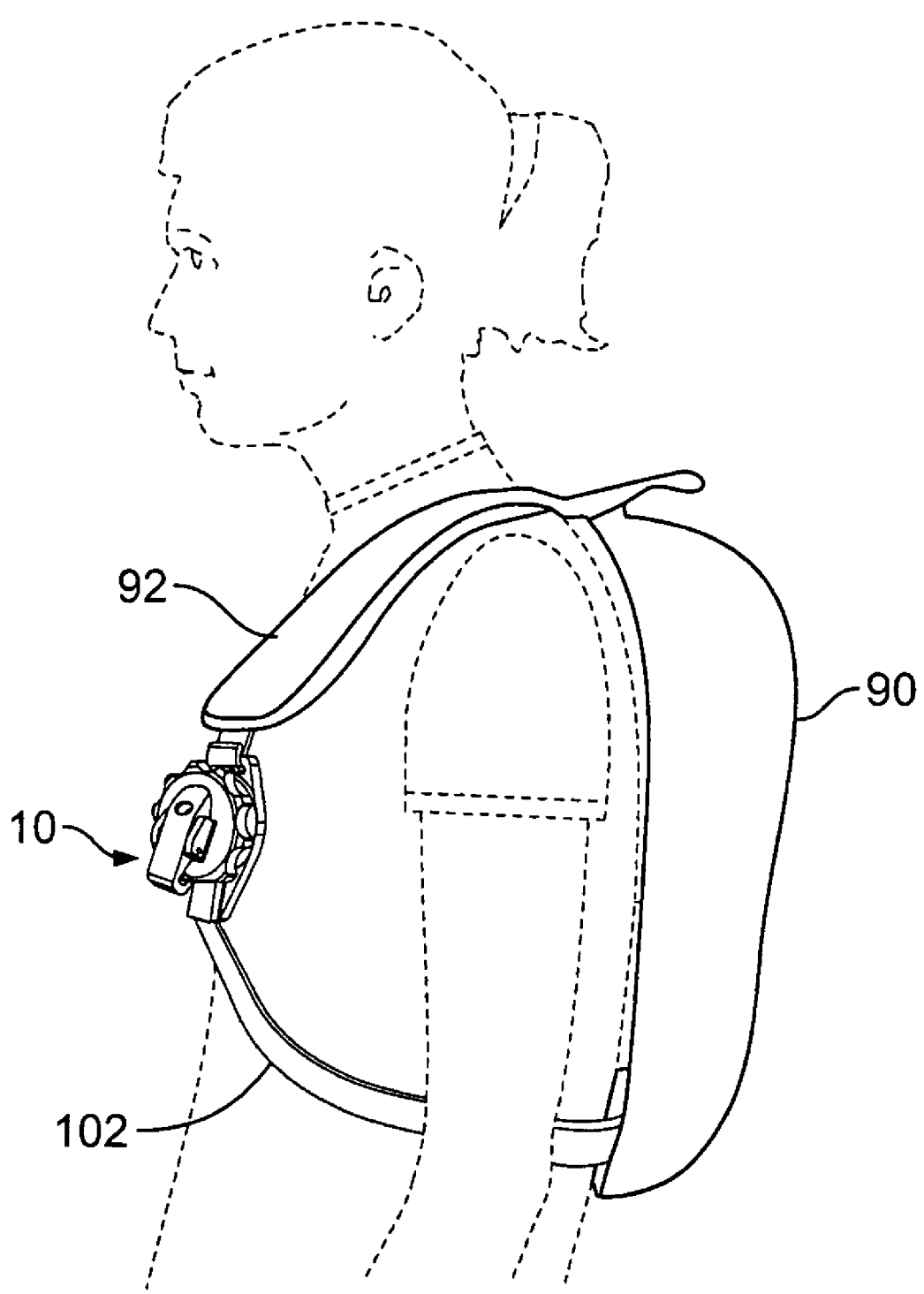
FIG. 3 depicts a side view of the radial adjuster device of the present invention as used on a cargo transport carrier worn by a typical animate load bearer.
Figure 4:
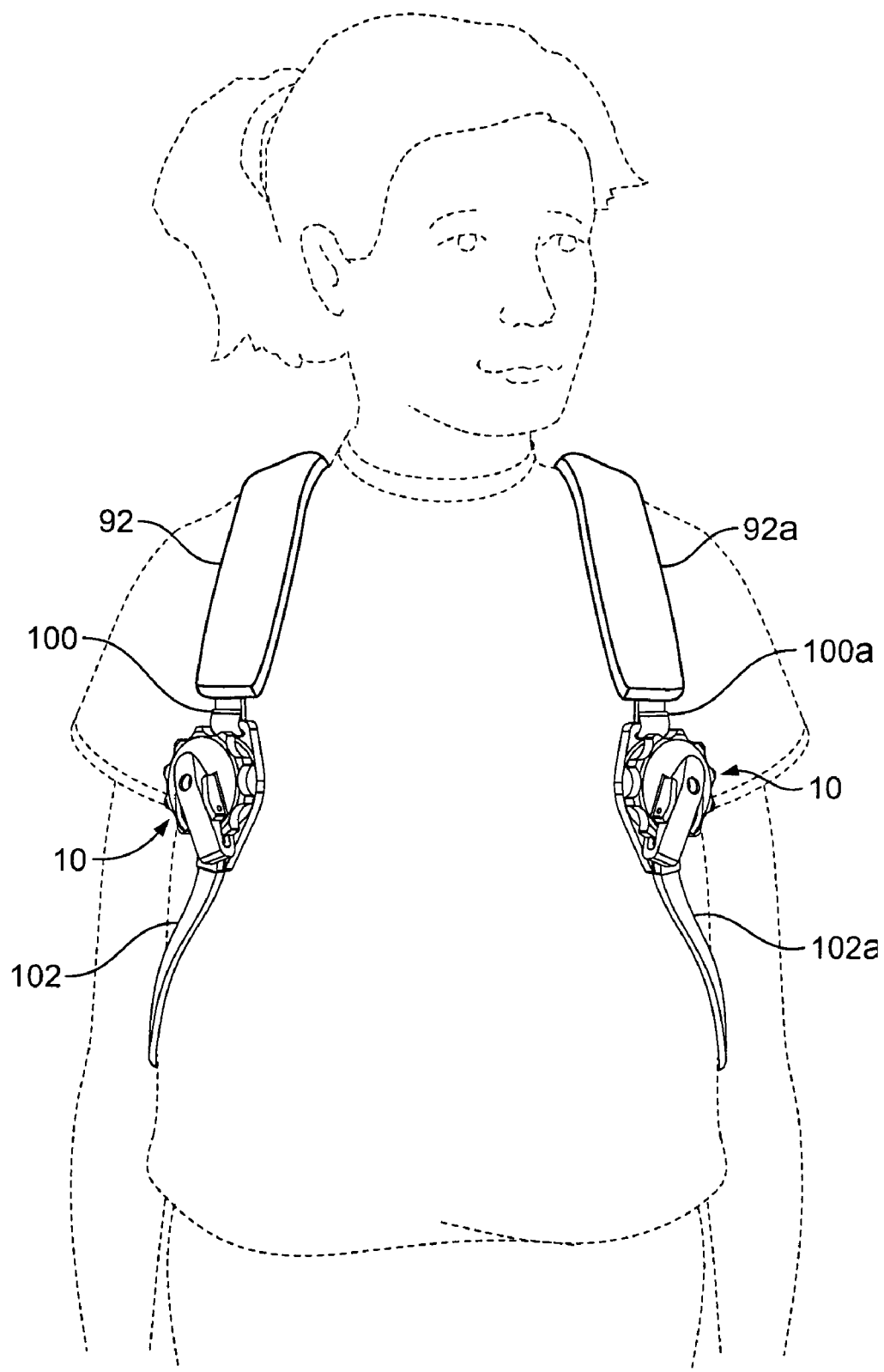
FIG. 4 depicts a front perspective view of the radial adjuster device of the present invention as used on a cargo transport carrier worn by a typical animate load bearer.

FIGS. 2, 3 and 4 show preferred embodiments of the present invention, in which a radial adjuster device (10) is attached to a cargo transport carrier (90). Radial adjuster device (10) is attached to each shoulder strap or other such support structure (92 and 92a) for a cargo transport carrier (90) to rotationally adjust cargo transport carrier (90) to a desired position on an animate load bearer. To connect radial adjuster device (10) to cargo transport carrier (90), adjustable straps (100 and 100a) are respectively threaded through first strap receiving opening (24) of base portion (20) on each respective laterally positioned radial adjuster device (10), and secured to cargo transport carrier (90) via conventional attachments means, including stitching, Velcro reinforcement, adhesive bonding, or other securing means. Adjustable straps (102 and 102a) are threaded through second strap receiving opening (52) on bottom end (50) of base portion (20) of each respective radial adjuster device (10), and further threaded through threading slot (38a) of base portion (20) and threading slot (84) of strap spool (82) on bottom side (80) of rotating portion (60). After adjustable straps (102 and 102a) are respectively threaded through and secured in threading slot (84), strap spool (82) is fitted onto spool receiver (42) of base portion (20) of each radial adjuster device (10).

An adjustable attachment means (75) such as a bolt, screw or variety of other such means, is positioned through the top of adjustable lever (72) and correspondingly through central attachment point (74) on top side (70) of rotating portion (60) to securely and operatively connect base portion (20) and rotating portion (60). Adjustable attachment means (75) may be adjusted with attachment means adjuster (75a) to increase or decrease rotational friction or resistance when rotating portion (60) is turned to adjust cargo transport carrier (90).

In operation, once a radial adjuster device (10) is attached to adjustable straps (100 and 100a), stationary straps (102 and 102a), and correspondingly to cargo transport carrier (90), an animate load bearer may single-handedly adjust one shoulder strap (92 or 92a) at a time, or simultaneously adjust both shoulder straps (92 and 92a) in-tandem to achieve the desired balance and position of cargo transport carrier (90). To adjust cargo transport carrier (90), an animate load bearer inserts his or her fingers in concave indentations (62) on the perimeter of rotating portion (60). Simultaneously, adjustable lever (72) of rotating portion (60) of each laterally positioned radial adjuster device (10) is depressed and rotating portion (60) turned to either spool adjustable straps (102 or 102a) about strap spool (82) to tighten shoulder straps (92 or 92a), or conversely to unspool adjustable straps (102 or 102a) to loosen one or both shoulder straps (92 or 92a) and correspondingly adjust cargo transport carrier (90). Turning rotating portion (60) also aligns insertion means (79) of rotating portion (60) with one of the plurality of radially disposed holes (40) on circumferentially disposed wall (34) of base portion (20). When the desired position is achieved, adjustable lever (72) is then released to deposit insertion means (79) into one of the plurality of radially disposed holes (40) to positionally secure radial adjuster device (10) in place. Thus, in operation, when rotating portion (60) is turned either clockwise or counterclockwise by an animate load bearer, adjustable straps (102 or 102a) either wrap around or unwrap from strap spool (82) of each respective radial adjuster device (10) to positionally adjust cargo transport carrier (90).

The above embodiments demonstrate that radial adjuster device (10) is widely versatile and can be used in place of numerous conventional strap adjusters on a vast array of conventional and specialized cargo transport carriers.

FUNCTIONALITY CHANGES

Having thus described the invention, it should be apparent that numerous structural modifications and adaptations may be resorted to without departing from the scope of the instant invention as set forth hereinabove and as defined below by the claims.

We claim:

1. A device coupled to and adjusting a cargo transport carrier, said device comprising, in combination:
   (a) a base portion;
   (b) a strap;
   (c) a means for attaching said strap to said cargo transport carrier; and
   (d) a rotating portion operatively attached to said base portion and spooling said strap, and having;
      a means for locking said rotation portion in place and conversely releasing said rotating portion and allowing for turning of said rotation portion to adjust said strap and therefore its length relative to said cargo transport carrier;
   (e) wherein said base portion further comprises a centrally positioned spool receiver and said rotating portion comprises a centrally positioned strap spool, for accommodating strap adjustment and securing said base portion and said rotating portion in operative contact; and
   (f) wherein said spool receiver of said base portion is hollow-centered and said strap spool of said rotating portion is hollow-centered and contains a threading slot through which said strap is received, and to which said strap is fixed to facilitate spooling when said rotating portion is turned.

2. The device of claim 1 wherein said base portion further comprises an attached circumferentially disposed wall having a plurality of radially disposed holes to assist in locking said device in place.

3. The device of claim 2 wherein said rotating portion further comprises a plurality of circumferentially disposed concave indentations to facilitate adjustment of said device.

4. The device of claim 3 wherein said means for locking said rotating portion in place or conversely releasing said rotating portion comprises a centrally attached adjustable lever atop said rotating portion.

5. The device of claim 4 wherein said adjustable lever is in operative contact with an attached insertion means, and deposits said insertion means into one of said plurality of radially disposed holes on said base portion when said adjustable lever is released, and removes said insertion means from one of said plurality of radially disposed holes on said base portion when said adjustable lever is depressed, which permits adjustment of said rotating portion when an animate load bearer engages said plurality of circumferentially disposed concave indentations to adjust said device.

6. The device of claim 5 wherein said adjustable lever is attached to said rotating portion by an adjustable attachment means, which passes through an aperture atop said adjustable lever, and further through said strap spool of said rotating portion, and further though said spool receiver of said base portion to fixedly attach said base portion and said rotating portion in operative communication.

7. A device coupled to and adjusting a cargo transport carrier, said device comprising, in combination:
   (a) a strap;
   (b) a base portion having;
      (i) a strap receiving opening to attach said strap to said base portion;
      (ii) an oppositely disposed strap receiving opening to attach said device to said cargo transport carrier;
      (iii) a centrally attached spool receiver for securing said device in place, and
      (iv) an attached circumferentially disposed wall having a plurality of radially disposed boles to assist in locking said device in place; and
   (c) a rotating portion having;
      (i) a centrally attached adjustable lever for either locking said rotating portion in place, or releasing said rotating portion and allowing for turning of said rotating portion to adjust said cargo transport carrier,
      (ii) a strap spool for receiving said strap from said strap receiving opening of said base portion, and either engaging or disengaging said strap when said adjustable lever is depressed or released, and said rotating portion is turned either clockwise or counterclockwise to adjust said cargo transport cater, and
      (iii) an insertion means in operative contact with said adjustable lever, which is removed from or inserted into one of said plurality of radially disposed holes of said base portion when said adjustable lever is respectively depressed or released.

8. The device of claim 7 wherein said insertion means is housed in a rounded cavity positioned on a rotating inner perimeter section of said rotating portion.

9. A device couple to and adjusting a cargo transport carrier, said device comprising, in combination:
   (a) a strap;
   (b) a base portion having;
      (i) a strap receiving opening to attach said strap to said base portion;
      (ii) an oppositely disposed strap receiving opening to attach said device to said cargo transport carrier; and
      (iii) an attached circumferentially disposed wall having a plurality of radially disposed holes to assist in locking said device in place; and
   (b) a rotating portion having;
      (i) a centrally attached adjustable lever for either locking said rotating portion in place, or releasing said rotating portion and allowing for turning of said rotating portion to adjust said cargo transport carrier,
      (ii) a strap spool for receiving said strap from said strap receiving opening of said base portion, and either engaging or disengaging said strap when said adjustable lever is depressed or released, and said rotating portion is turned either clockwise or counterclockwise to adjust said cargo transport carrier, (iii) a plurality of circumferentially disposed concave indentations for engaging and turning said rotating portion, and (iv) an insertion means in operative contact with said adjustable lever, which is removed from or inserted into one of said plurality of radially disposed holes of said base portion when said adjustable lever is respectively depressed or released.

* * * * *